US011216457B1

(12) United States Patent
Pandis et al.

(10) Patent No.: US 11,216,457 B1
(45) Date of Patent: Jan. 4, 2022

(54) SELECTIVELY ASSIGNING JOIN OPERATIONS FOR REMOTE DATA PROCESSING

(71) Applicant: Amazon Technologies, Inc., Seattle, WA (US)

(72) Inventors: Ippokratis Pandis, Menlo Park, CA (US); Yannis Papakonstantinou, La Jolla, CA (US)

(73) Assignee: Amazon Technologies, Inc., Seattle, WA (US)

( * ) Notice: Subject to any disclaimer, the term of this patent is extended or adjusted under 35 U.S.C. 154(b) by 556 days.

(21) Appl. No.: 15/389,318

(22) Filed: Dec. 22, 2016

(51) Int. Cl.
*G06F 16/2453* (2019.01)
*G06F 16/22* (2019.01)
*G06F 16/2455* (2019.01)

(52) U.S. Cl.
CPC ........ *G06F 16/24542* (2019.01); *G06F 16/22* (2019.01); *G06F 16/2455* (2019.01)

(58) Field of Classification Search
CPC ............... G06F 16/24542; G06F 16/22; G06F 16/2455
See application file for complete search history.

(56) References Cited

U.S. PATENT DOCUMENTS

| | | | | |
|---|---|---|---|---|
| 5,943,666 A * | 8/1999 | Kleewein | ............ | G06F 16/2471 707/E17.032 |
| 6,105,017 A | 8/2000 | Kleewein et al. | | |
| 6,615,203 B1 * | 9/2003 | Lin | .................... | G06F 16/24542 707/999.003 |
| 7,908,242 B1 * | 3/2011 | Achanta | .............. | G06F 16/2453 707/602 |
| 8,005,854 B2 | 8/2011 | Chawla et al. | | |
| 8,122,008 B2 | 2/2012 | Li et al. | | |
| 2003/0001864 A1 * | 1/2003 | Charpentier | ........ | G06F 16/9577 707/E17.121 |
| 2006/0167865 A1 * | 7/2006 | Andrei | .............. | G06F 16/24544 707/999.004 |
| 2016/0034587 A1 * | 2/2016 | Barber | .............. | G06F 16/24544 707/754 |

* cited by examiner

*Primary Examiner* — Kannan Shanmugasundaram
(74) *Attorney, Agent, or Firm* — Robert C. Kowert; Kowert, Hood, Munyon, Rankin & Goetzel, P.C.

(57) ABSTRACT

Join operations may be selectively assigned from local data processing to remote data processing. Aggregation queries directed to distributed data sets may have query plans generated that include join operations. Some join operations may be executed locally while others may be assigned for remote execution at a remote data processing engine. Join operations may be identified and evaluated for remote execution according to a processing constraint for the remote data processing engine. For those join operations that satisfy the remote data processing engine, the query plan may be modified to assign the join operation for remote execution. A result for the aggregation query may be generated according to the modified query plan and the result sent in response to the aggregation query.

17 Claims, 9 Drawing Sheets

SELECTIVELY ASSIGNING JOIN OPERATIONS FOR REMOTE DATA PROCESSING

BACKGROUND

Processing large amounts of data is an integral part of many types of systems, services, and applications. In order to provide quick and efficient operations with respect to data, computing resources may need to be managed to optimally distribute the work that is performed by different data processing components. For example, the performance location of different data manipulation operations may offer opportunities for performance improvements. Determining the location for performing data processing operations can be done in several ways. For example, data processing may be co-located with data storage that stores the data to be processed. However, not all data processing locations may have equal processing capacity. Some locations, for instance, may have limited communication bandwidth, processing capacity, or storage for data processing operations. Accounting for different data processing limitations at different data processing locations when determining data processing workload distributions may optimize the performance of data processing operations at the different locations.

Figure 1:
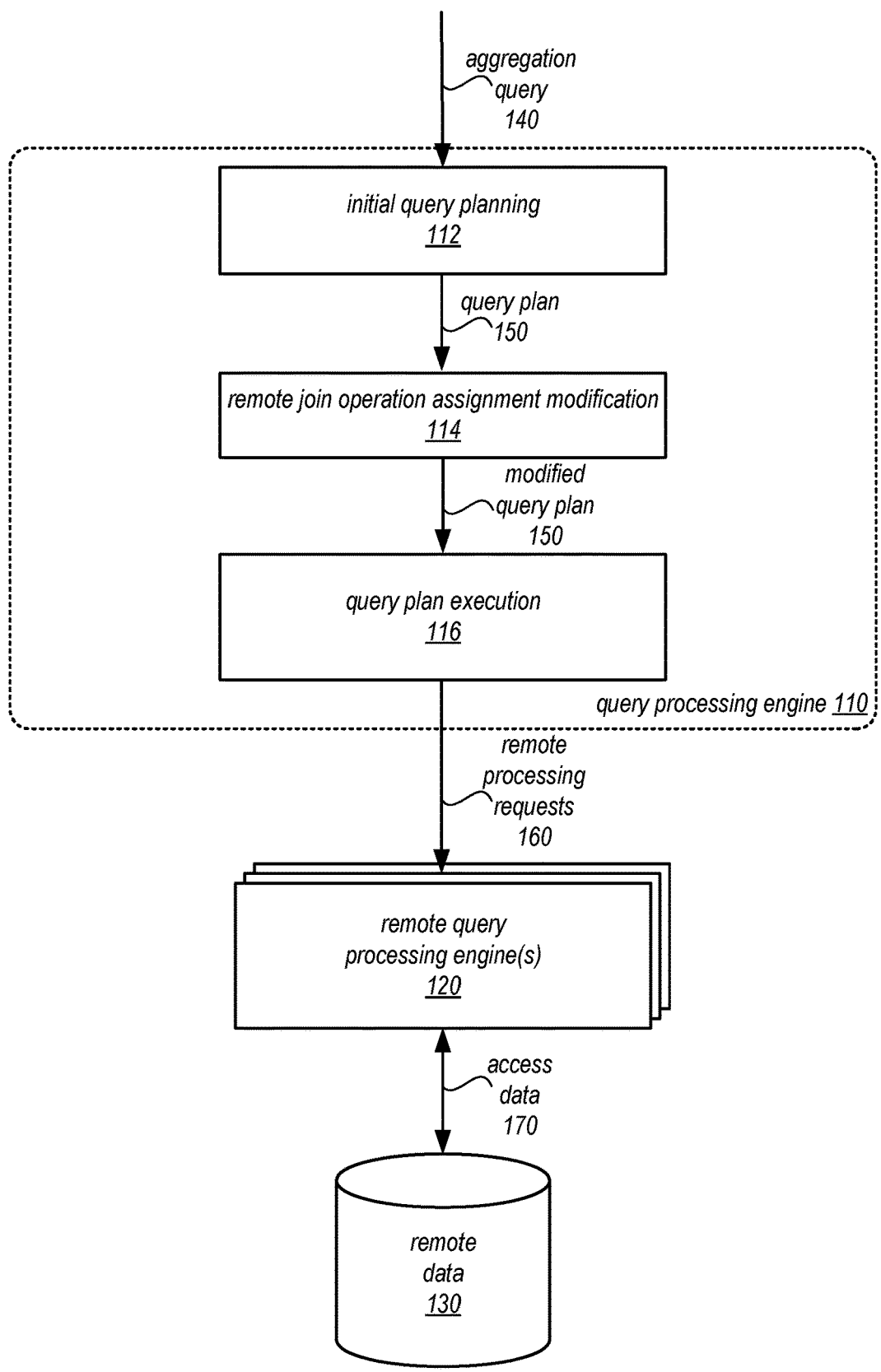
FIG. 1 illustrates a logical block diagram of selectively assigning join operations for remote data processing, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various embodiments of selectively assigning join operations for remote data processing are described herein. Distributed processing offers enormous benefits when performing tasks that can be divided and distributed amongst multiple processing components. For operations or tasks that would be long running or costly if processed singly, distributed processing may execute the operations or tasks quickly and efficiently. Query processing, for example, may distribute the work of accessing and evaluating data targeted by a query in tiered fashion, so that a query processing component may request that certain operations or tasks be performed by remote query processing components.

Determining which tasks or operations to send to remote query processing components can involve many factors. The location or format of data, for instance, may determine whether a remote query processing engine is capable of accessing or processing data as part of processing a query. Moreover, performance limitations or constraints at remote query processing components may affect the efficiency of performing different operations or tasks at remote query processing components. For example, system memory constraints may limit the amount of results that could be retained when executing a query operation at a remote query processing component. In various embodiments, query planning may be performed that accounts for remote query processing constraints. In this way, planning determinations that assign or request the execution of different operations at remote query processing components, can optimally determine which operations could be efficiently executed remotely, as well as determining those operations which may be better to perform locally.

Join operations are one type of operation that may change the efficiency of query execution depending on the location to which they are assigned. Join operations may be implemented as part of a plan to execute a query in order to associate data from one data object (e.g., a first table) with another data object (e.g., a second table). For example, a query may request information that is stored across a distributed data set (e.g., multiple tables). The query may specify that items with a specified attribute found in a first data object may be used to retrieve other attributes of associated items in a second data object. In this example, a join operation may be performed to associate and retrieve the other attributes of the associated items in the second data object. Many different types of join operations, such as full joins (e.g., joins that are fully commutative, like inner joins or full outer joins, or joins that only associate some information between data objects, like semi-joins, left outer joins, or right outer joins).

As join operations associate attributes, items, or other data values from one data object with another, join operations may be considered for remote query processing when executing queries directed toward a distributed data set. For example, aggregation queries may be executed that apply an aggregation function (e.g., count, summation, average, deviation, minimum value, maximum value, etc.) over a set of associated data values found by associations between different data objects (e.g., join operations). An aggregation operation for the aggregation query may be assigned for remote data processing as the data values which are being aggregated may be found in a remote data object. In some scenarios, assigning the join operation along with the aggregation operation may reduce the processing costs for executing the aggregation operation remotely. Thus, selectively assigning join operations for remote data processing may be performed to identify the scenarios where remote assignment of join operations for aggregation queries increases the efficiency of executing the aggregation query.

FIG. 1 illustrates a logical block diagram of selectively assigning join operations for remote data processing, according to some embodiments. Query processing engine 110 may receive queries, such as aggregation query 140 on behalf of clients to access data stored in one or multiple locations. Data may be a single data object or set of data objects, records, files, tables, or other data structures. Data may be stored locally (not illustrated) with respect to query processing engine 110 or remotely, such as remote data 130. Aggregation query 140 may be specified according to a protocol, format, interface, or language, such as Structured Query Language (SQL), and may specify one or more operations, such as operations to apply an aggregation function as part of executing a query that searches for data that satisfies certain conditions (e.g., predicates), filters data, orders data, and/or otherwise modifies data that is found as a result of the aggregation query 141. Query processing engine 110 may be implemented as part of a database system or other data access and management system that receives queries for execution with respect to data, on one or more computing devices, such as computer system 1000 discussed below with regard to FIG. 7.

Query processing engine 110 may send remote processing requests 160, such as request to perform join operations 160 or requests to perform other processing operations, such as request to scan, filter, aggregate, or otherwise execute operations to service aggregation query 140, to other query processing engines that are remote (e.g., separated via a network connection and operated independently from query processing engine 110) to query processing engine 110, such as remote query processing engine(s) 120, which may access 170 remote data 130 in order to perform requested processing operations 160. For example, query processing engine 110 may send a request 160 that instructs a particular processing operation, such as a data scan, filter, aggregation, or other operation performed with respect to remote data 130. Remote query processing engine(s) 120 may, in various embodiments, be implemented as a thin query processing engine, providing a smaller processing feature or capability set than other query processing engine(s) 110. For example, remote query processing engine(s) 120 may be limited to performing operations on a single data object and/or operations that do not persistently store intermediate results generated as part of executing the operation. Remote query processing engine(s) 120 may also have processing constraints that limit the ability of remote query processing engine(s) 120 to perform some data operation requests.

Query processing engine 110 may implement initial query planning 112. Initial query planning may parse or otherwise determine an initial query plan for executing query 140. For example, a query plan may include performing multiple different operations, such as operations to access or determine where data is located by scanning data or accessing an index for data, as well as operations to combine or join data from different locations. Query planning 112 may also include techniques to optimize the selection or ordering of operations. For example, cost-based query optimization may select from multiple possible query plans to determine which query plan provides a least costly utilization of processing resources to execute the query (e.g., number of input/output (I/O) operations, storage space, parallelism opportunities, etc.). Query plans may be represented in various ways, such as graph-based representations as discussed below with regard to FIGS. 4A-5, or other representations that identify the operations to be performed in order to execute aggregation query 140.

In some embodiments, query processing engine 110 may implement remote join operation assignment modification 114 to identify join operations that may be performed at remote query processing engine(s) 120. For example, a tree structure of a query plan may be evaluated for a join operation in the left corner that joins a scan operation with another operation, as discussed below with regard to FIGS. 4A-6. The identified join operations may, in some embodiments, be conditionally assigned to remote query processing engine(s) 120. For example, a conditional query plan node, operator, or description may be included in the modified query plan to identify the join operation for possible execution at remote query processing engine(s) 120.

Figure 3:
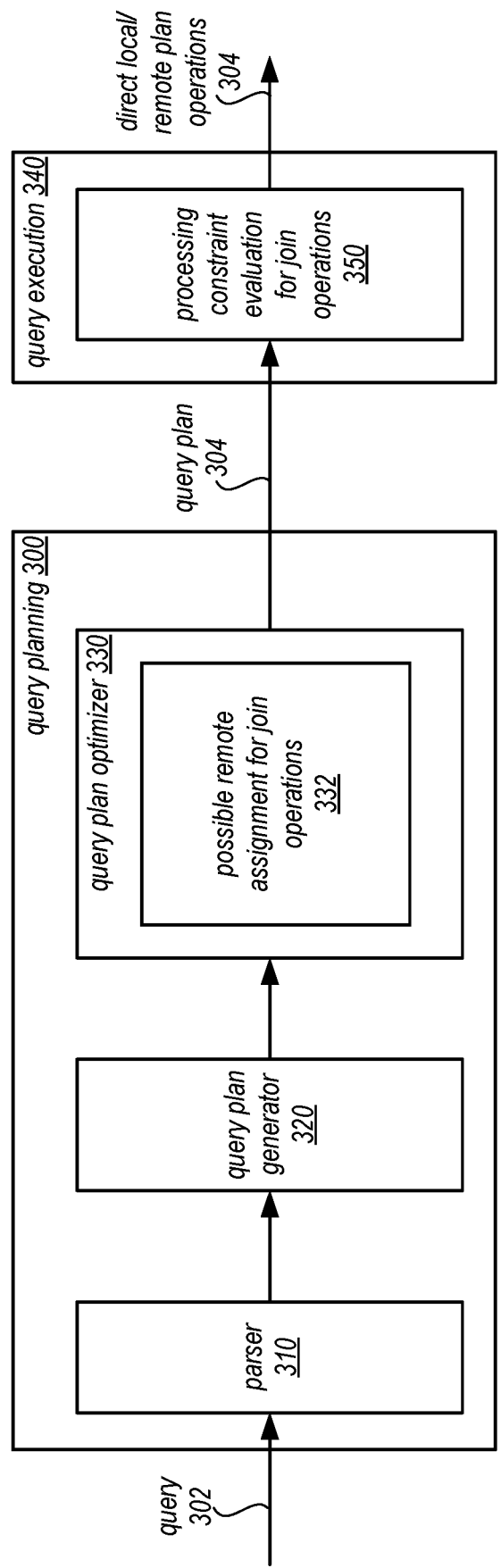
FIG. 3 is a logical block diagram illustrating query planning for a client query processing engine that implements selectively assigning join operations for remote data processing, according to some embodiments.
Figure 4A:
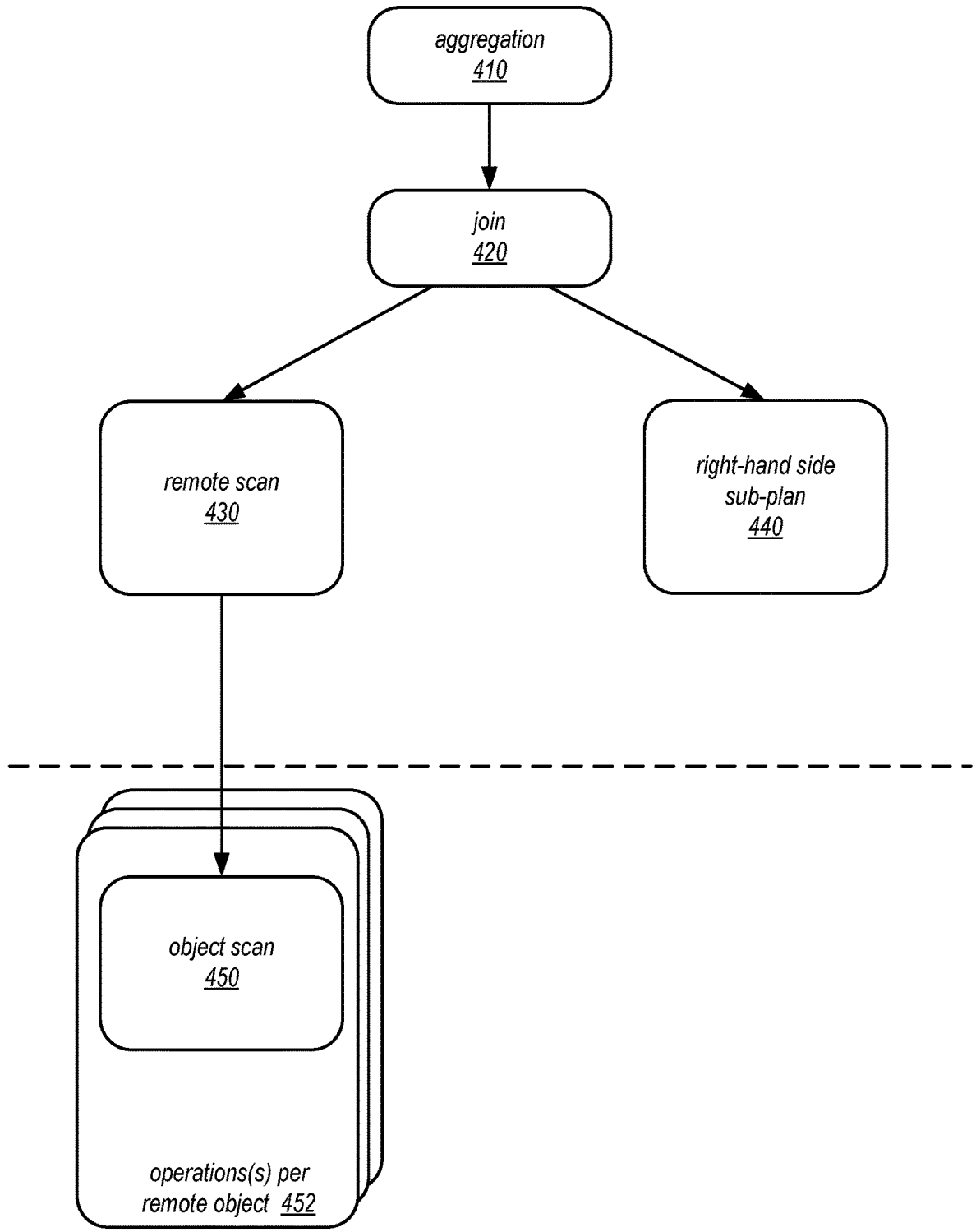
FIGS. 4A-4C are logical diagrams illustrating modifications to assign a join operations for remote processing in query plans, according to some embodiments.
Figure 4B:
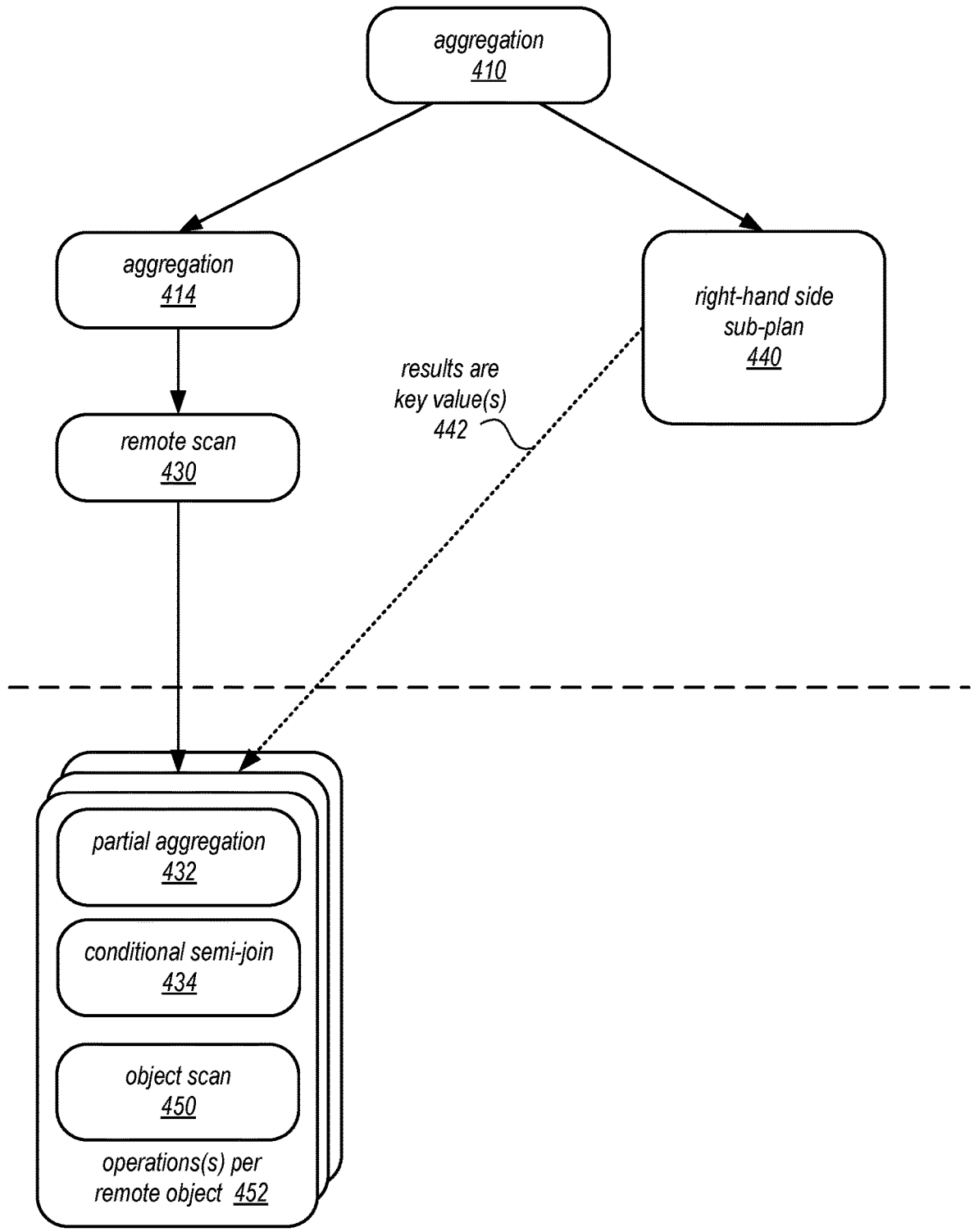
Figure 4C:
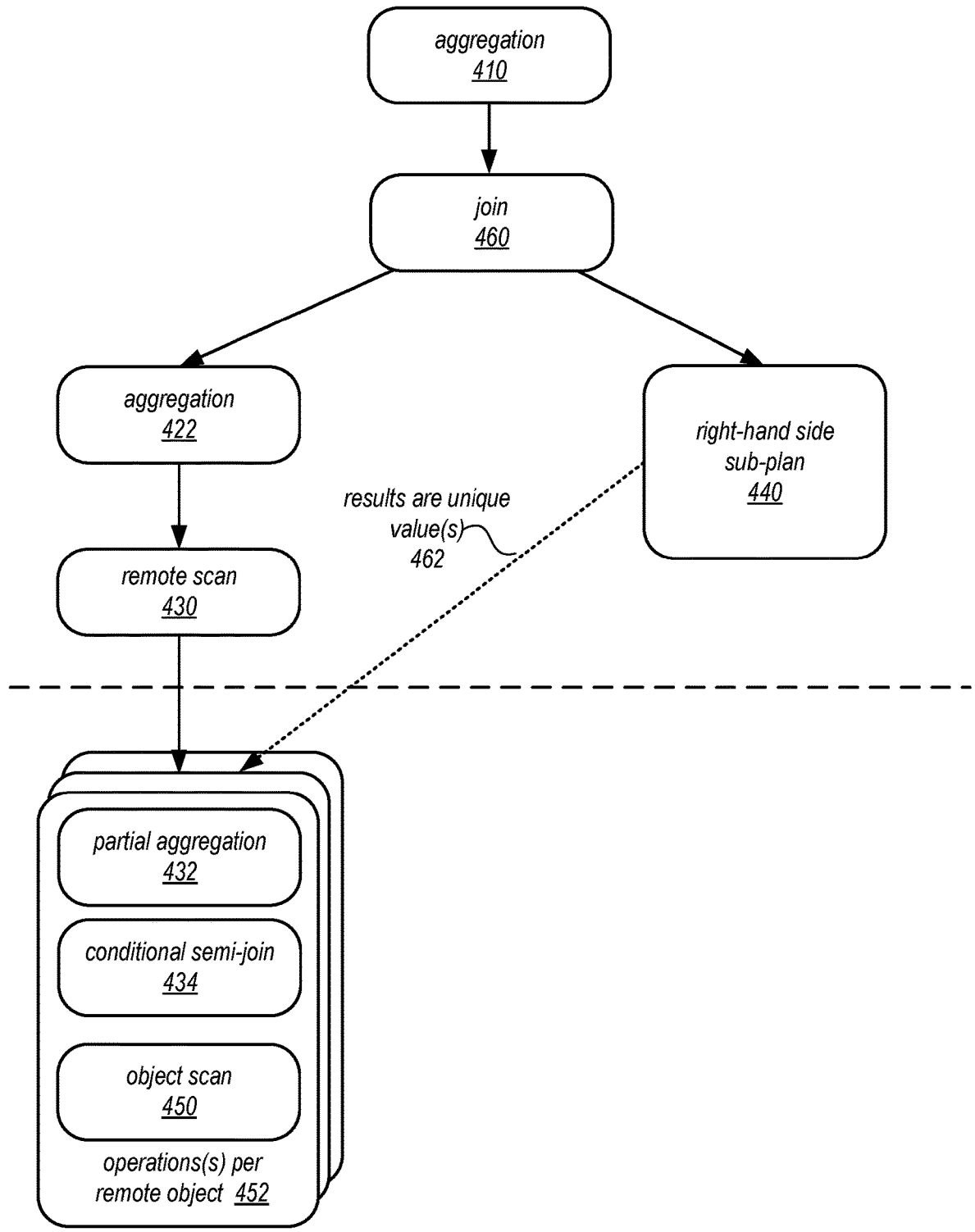

In various embodiments, the identified join operation may be evaluated to determine whether the join operation satisfies a processing constraint for the remote data processing engine(s) 120. For example, a processing constraint may be a processor utilization constraint or memory utilization constraint. Consider a scenario where a computer implementing a remote query processing engine 120 performing an aggregation operation upon remote data 130 has limited memory space available to store the results of the aggregation operation while the aggregation operation is being performed (e.g., incomplete aggregation results). A join operation that would associate, and thus add data values to those maintained in the memory as a result of the aggregation operation could reduce the number of results that could be maintained in the memory space. Therefore, if the join operation were determined to associate the aggregation operation with a number of operations that would exceed the memory space available, then the join operation may not be executed as a remote processing operation, but may instead be performed locally. Alternatively, if the join operation were determined to satisfy the constraint (e.g., not exceed the available memory space), then the join operation may be assigned and executed remotely at remote query processing engine(s) 120. FIGS. 3-4C, discussed below, provide further examples of selective assignment of join operations for remote processing. Further optimizations may be performed in addition to determining whether join operations can be pushed to remote query processing engines Please note that the previous description of selectively assigning join operations for remote data processing is a logical illustration and thus is not to be construed as limiting as to the implementation of storage for data, query processing engines, or query planning components that perform initial query planning or query plan modification. For example, local data accessible to query processing engine 110 may be accessed and processed for executing received queries.

This specification begins with a general description of a query engine that implements selective assignment of join operations for remote data processing. Then various examples of a selective assignment, as well as interactions among components performing selective assignment techniques are discussed. A number of different methods and techniques to implement selective assignment of join operations for remote data processing are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
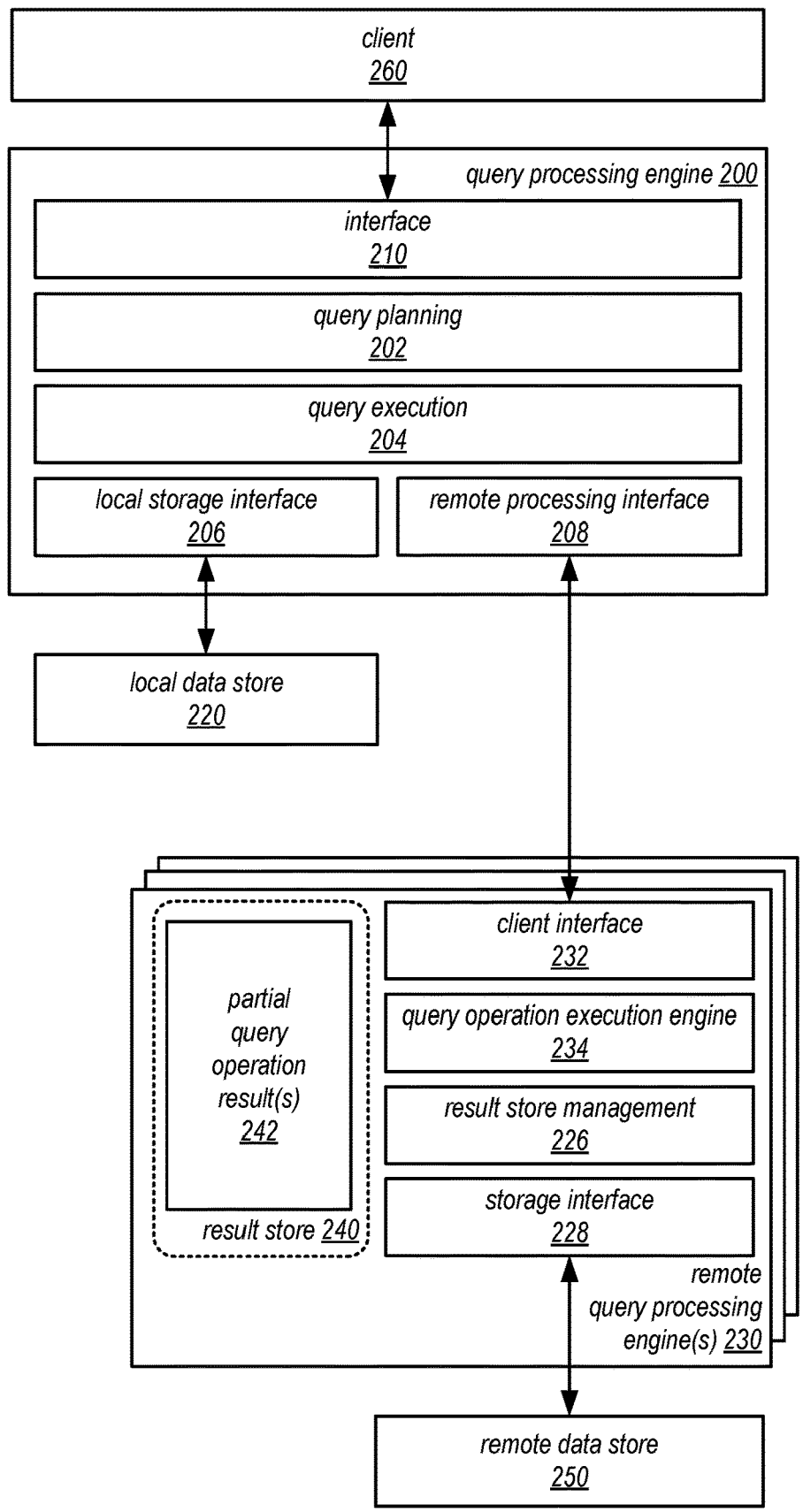
FIG. 2 is a logical block diagram illustrating a query processing engine that implements selectively assigning join operations to remote query processing engines, according to some embodiments.

FIG. 2 is a logical block diagram illustrating a query processing engine that implements selectively assigning join operations to remote query processing engines, according to some embodiments. Query processing engine 200 may receive a request from a client 260, such as a query that aggregates data values in a distributed data set, such as data that may be stored in local data store 220 and remote data store 250. Query processing engine 200 may determine query execution plan to perform the query and may direct the performance of processing operations locally, including accessing local data store 220, and at remote query processing engine(s) 230, which can access remote data store 250, according to the determined query plan. Query processing engine 200 may then provide results of the query to client 260.

Query processing engine 200 may be implemented as part of a computing device, compute node(s), or other computing system, such as computing system 1000 discussed below with regard to FIG. 7. Query processing engine 200 may interact with client 260 via interface 210. For example, a query be recited that is formatted according to a programmatic interface (e.g., an Application Programming Interface (API)). Interface 210 may parse client requests and dispatch query requests to query planning 202. Query planning 202 may be implemented at query processing engine 200 in order to determine the operations to be performed in order to execute the query, as discussed in detail below with regard to FIG. 3. Query processing engine 200 may also implement query execution 204 to direct the performance of operations included in the query plan, including join operations that have been selectively assigned to remote query processing engine(s) 230 as well as other remotely assigned query processing operations.

Query processing engine 200 may implement local storage interface 206 to provide access to data objects stored in local data store 220. For example, local storage interface 206 may be a storage device driver or other storage device interface component (e.g., implemented as part of an operating system or execution platform the runs query processing engine 200). Local storage interface 206 may interpret and execute read requests from query execution 204 and transmit them to local data store 220 to retrieve the desired data from local data store 220.

Query processing engine 200 may also implement remote processing interface 208 to format, send, receive, and/or otherwise process requests to perform processing operations at remote query processing engine(s) 230. For example, remote processing interface 208 may generate requests formatted according to an API or other interface exposed by remote query processing engine(s) 230 to submit and receive the results of processing operations.

Remote query processing engine(s) 230 may be implemented as part of a computing device, compute node(s), or other computing system, such as computing system 1000 discussed below with regard to FIG. 7. Remote query processing engine(s) 230 may interact with both query processing engine 200 that submits processing operations (e.g., aggregation operations and join operations) to remote query processing engine(s) 230 via client interface 232 and remote data store 250 (which may only be remote from the prospective of query processing engine 200 or may also be remote from remote query processing engine(s) 230) via storage interface 240. Results for executing operations may be maintained in result store 240 (which may be implemented by a persistent or non-volatile storage device or a volatile storage device, such as a random access memory device).

Remote query processing engine(s) 230 may implement client interface 232 to receive, interpret, dispatch, and/or parse processing operation requests. For example, an aggregation operation request may include an identifier for the data to be aggregated, such as an identifier for data objects remote data store (e.g., object name, key, file path, or other locator), grouping attributes indicating an association between items in the table upon which the aggregation operation is to be applied, and the aggregation operation type (e.g., summation, average, deviation, minimum value, maximum value, etc.). Other processing operations, such as join operations, may include the attributes for executing the operations (e.g., the data values to be joined with aggregation data values). In some embodiments, client interface 232 may be implemented as a programmatic interface (e.g., API).

Remote query processing engine(s) 230 may implement query operation execution engine 234 which may receive operation requests (e.g., scan operations, aggregation operations, join operations, etc.) and execute the requested operation. For example, query operation execution engine 234 may initiate read requests to remote data store 250 to read entries from table(s) stored in remote data store 250. Query operation execution engine 234 may maintain operation state information as well as recovery or retry information (e.g., the entries which have and have not been processed). Query operation execution engine 234 may generate query operation results (which may be partial 242 or complete) in result store 250. Query operation execution engine 234 may detect completion of processing operations and return results to query processing engine 200.

Remote query processing engine(s) 230 may implement storage interface 228 to provide access to data stored in remote data store 250. For example, storage interface 228 may be a storage device driver or other storage device interface component (e.g., implemented as part of an operating system or execution platform the runs remote query processing engine(s)). Storage interface 228 may interpret and execute read requests from query operation execution engine 234 and transmit them to remote data store 250 to retrieve the desired data from remote data store 250.

Remote query processing engine(s) 230 may also implement result storage management 226 which may handle updates, insertions, and evictions for partial query operation results(s) 242 stored in results storage 240. For partial results generated by processing operations, such a aggregation operations, result store management 226 may identify whether space exists in results store 240 to store the partial result. Consider that some partial results may update an existing update (e.g., increasing a partial count results for a count aggregation operation), and thus result store management 226 may update the corresponding result (e.g., increase the counter further) without utilizing additional space in result store 240 to store the partial result. However, for partial aggregation results that do not update an existing result, result storage management 226 may have to evict other partial query operation result(s) 242 in order to make space available for storing the partial query result under consideration. For example, result store management 26 may track available storage space by tracking the number of stored partial results. The constraint on result store 240 may be a limitation on the number of stored results 242 that may be stored at a time, when new aggregation result is received that would exceed the number limitation, then result store management 226 may select result(s) for eviction. Evicted results may be sent to query processing engine 200 and may be identified as a partial result for the operation.

Remote query processing engine(s) 230 may implement (or access) result store 242 in order to maintain partial query result(s) 242 while executing an operation on behalf of query processing engine 200. Result store 240 may be limited or constrained in order to accommodate a lightweight implementation of remote query processing engine(s) 230. For example, remote query processing engine(s) 230 may be implemented without query operation planning to reduce the processing overhead for executing processing operations. Instead, remote query processing engine(s) 230 may implement query operation execution engine 234 to perform processing operations as specified by the processing requests. In this way, remote query processing engine(s) 230 can offer high-speed scanning and operation processing rates using a memory based result store 240, to provide fast query operation processing. For instance, result store 240 may be implemented by one or more random access memory (RAM) components, such as static RAM (SRAM) or dynamic RAM (DRAM), or on a flash-based storage component, in some embodiments.

Remote data store 250 and local data store 220 may store data that is accessed in order to perform data processing operations upon a distributed data set. Remote data store 250 and local data store 220 may be implemented as one or more of any type of storage devices and/or storage system suitable for storing data accessible to query processing engine 200 or remote query processing engine(s) 230, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not configured according to RAID), optical storage devices, tape drives, RAM disks, Storage Area Network (SAN), Network Access Storage (NAS), or combinations thereof.

Client 260 may encompass any type of client that submits requests to query processing engine 200 via client interface 210, including requests for aggregation operations. For example, a given client 260 may encompass an application, such as a user interface for a database, a media application, an office application or any other application that may make use of persistent storage resources, such as local data store 220 and remote data store 250, to store and/or access one or more data objects, such as a database of multiple tables. In some embodiments, such an application may include sufficient protocol support (e.g., for a suitable version of Hypertext Transfer Protocol (HTTP) or Internet Small Computer Systems Interface (iSCSI)) for generating and processing aggregation operation requests.

Client 260 may convey queries and other requests to and receive responses from query processing engine 200 via direct connection or network connection. In various embodiments, client 260 may be a computing system or device that is not directly attached to a computing system or device implementing query processing engine 200, local data store 220 or remote data store 250, and may convey query requests via a network that connects query processing engine 200 and client 260. For example, a network may encompass any suitable combination of networking hardware and protocols necessary to establish network-based-based communications between client 260 and query processing engine 200. The network include the various telecommunications networks and service providers that collectively implement the Internet or the network may include private networks such as local area networks (LANs), wide area networks (WANs), or storage area networks (SANs) as well as public or private wireless networks.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of compute nodes (or simply, nodes), each of which may be similar to the computer system embodiment illustrated in FIG. 7 and described below. In various embodiments, the functionality of a given component (e.g., a component of the aggregation agent) may be implemented by a particular node or may be distributed across several nodes.

FIG. 3 is a logical block diagram illustrating query planning for a client query processing engine that implements selectively assigning join operations for remote data processing, according to some embodiments. Query planning 300 may implement parser 310 to receive a query statement, such as a SQL statement, and determine the various requested operations to perform as a result of the query. For example, parser 310 may generate a query tree for a given query input string to separate out the various query clauses, fields, predicates, conditions, commands, or other query information for planning and optimization. Query planning 300 may implement query plan generator 320. For example, plan generator 320 may translate the parsed query tree into a query plan including different operations to execute the query plan (e.g., a tree of plan operation nodes, which may be later used to generate query execution code).

Query planning 300 may also implement query plan optimizer 330, which may modify or change the initial query plan in order to optimize execution of the query. For example, query plan optimizer 330 may perform a cost-based optimization to select one of various combinations or orderings of plan operator nodes in a tree that produces a least costly plan (e.g., in terms of processing resources, such as time, communication bandwidth, memory utilization, processor utilization, etc.). Query plan optimizer 330 may assign the performance of different operations for remote data processing. For example, as noted above, remote data processing operations may include operations that scan operations that filter or project data results, aggregation operations that aggregate data values and provide partial or complete aggregation results, sorting, grouping, or limiting operations that organize or reduce the determined data results from remote data. In some embodiments, query plan optimizer may implement possible remote assignment for join operations 332 to identify join operations for possible remote processing in some embodiments. FIGS. 4A-4C, discussed below, provide different examples of possible remote assignment for join operations that may be performed.

As part of assigning operations for remote processing remote, query plan optimizer 330 may modify the query plan to include data plan operation nodes that correspond to remotely assigned operations. For example, query plan optimizer 330 may insert a plan node that represents scanning operations to be performed at a remote query processing engine as part of a subquery for executing the query. This remote scanning node may identify which operations are assigned for remote execution and may be annotated with a corresponding interface command to execute the operation remotely at the remote query processing engine as well as specific data that should be scanned (e.g., partition, file, table, or other data object identifiers). The remote scanning node may include predicates, regular expressions or other information for projections, filters, or limitations (e.g., a SQL limit clause) to be applied as part of the scan operation. Another example of a plan node for a remote operation may be a remote aggregation plan node. Different types of associative aggregation operations (e.g., count, minimum value, maximum value, average, summation, deviation, or other statistical calculations) may be identified by the aggregation operation plan node. A grouping indication (e.g., a SQL group by clause) may identify the associate values over which aggregation functions are applied. Query plan optimizer 330 may include conditional statements or other logical operators in the query plan 304 for join operations may or may not be performed remotely based on the processing constraints of remote processing engines.

Query plan 304 may be provided to query execution 340 which may direct local and remote plan operations 304 according to the query plan. For example, query execution 340 may traverse plan nodes in a query plan tree to perform processing operations in a sequence determined by the plan tree. Local operations may be directed to or performed by accessing local data and performing the local operations using local processing resources. Query execution 340 may send requests to a remote query processing engine to execute remotely assigned processing operations. Query execution 340 may implement processing constraint evaluation for join operations 350 as part of query execution 340 in order to dynamically determine at runtime whether a join operation (e.g., a full join or a semi-join operation) that is identified for remote processing should be executed at a remote query processing engine, as discussed below. If not, then the join operation may be executed locally.

FIG. 4A is an initial query plan generate for a query that performs an aggregation for a distributed data set. Consider an example SQL query that aggregates data values in a data set:

```
SELECT AGGREGATION(f.meas) AS sm
FROM Remote_Fact f
JOIN Local_Dimension1 d1 ON f.dim1=d1.id
WHERE d1.name=?
```

Such a SQL query might generate a query plan depicted in FIG. 4A. The aggregation operation of the "meas" column in remote table "Fact" may be represented by aggregation plan node 410. This plan may further implement the join operation as join plan node 420, which joins the results of the right-hand side sub plan 440 (which may include one or more multiple operation nodes not illustrated), and which in this case may be a scan of table "Dimension1" on column "name" that returns "id" of those rows where "name"="?." Remote scan operation node 430 may indicate which operations are locally executed 402 and which operations are remotely executed 404. For example, remote scan 430 may point to object scan nodes 450 that are directed to the operations to be performed for remote objects 452 (e.g., partitions of remote table "Fact").

Query plan pattern matching may be employed to recognize a join operation, such as join operation 420, for remote processing 404. For example, the left-hand corner of the tree may be evaluated to see if there is a join that joins a remote scan operation with one or more local operations. In FIG. 4A, the left hand corner, remote scan 430 (and operations per remote object 452) are joined by join operation 420 with one or more operations in right-hand side sub-plan 440. Therefore, join operation 420 may match the pattern of a join operation that may be identified for possible remote execution.

FIG. 4B illustrates a modified query plan that has assigned additional operations to remote processing 404. For example, aggregation operation 410 can be pushed down as partial aggregation operation 432 (which may be performed on individual remote data objects 452). The join operation may be represented as a semi-join operation 434 that is conditionally assigned to remote objects 452. Because the aggregation operations are partial aggregations (which may only provide partial aggregation results for associated data values), an additional local aggregation operation 414 may be added to aggregate the partial aggregation results from partial aggregation operations 432 before performing global aggregation operation 410. Conditional semi-join operation 434 may be dynamically evaluated based on the results 442 of right-hand side sub-plan 440. For example, if right-hand side sub-plan 440 provides the set of "ids" from table "Dimension1" on column "name" where "name"="?" and the number of returned "ids" is less than a result limit, then conditional semi-join 434 may be performed remotely 404 instead of locally 402. If the results 442, are key values as illustrated in FIG. 4B, then join operation 420 may be eliminated.

FIG. 4C illustrates another modified query plan. In FIG. 4c, the results of a query plan where the results of right-hand side sub-plan are for unique values, but not key values. If the results are unique values 462, then a join operation 460 may be added back to the query plan, even though conditional semi-join 434 may also be performed.

Although semi-join operations may not be assigned for remote execution in circumstances where the results (e.g., 442 or 462 in FIGS. 4B and 4C) are greater than a result limit, some aggregation operations may still be assigned for remote execution. For example, in the query plan illustrated in FIG. 4A, results from the right-hand sub-plan 440 that are used as a join attribute for join 420 may still be assigned as a grouping attribute for the partial aggregation operation. For example, the join of "f.dim1=d1.id" may take the join attribute "f.dim1" and include it as a grouping attribute for partial aggregation operation 432.

Figure 5:
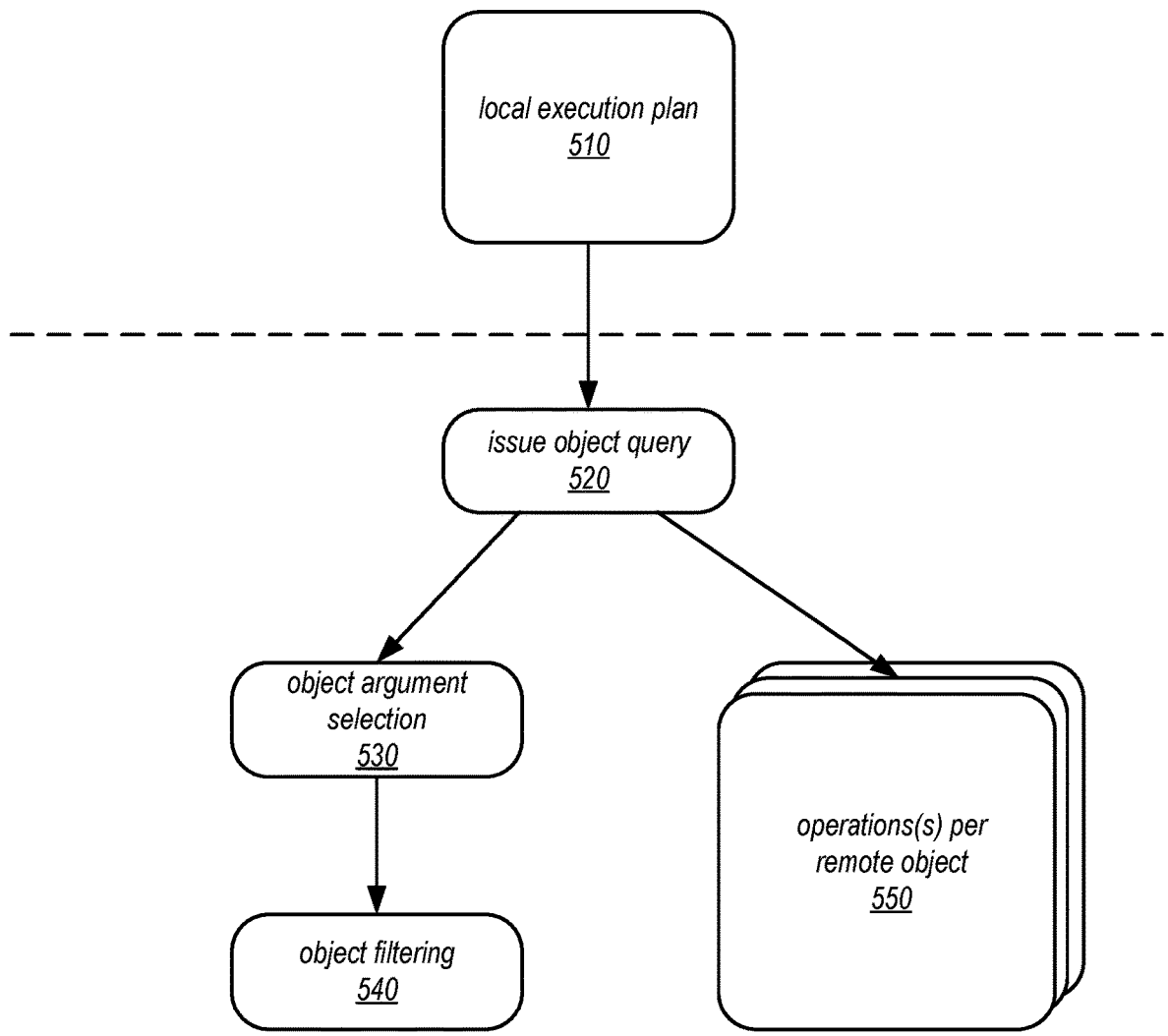
FIG. 5 is a logical diagram illustrating input value determinations for remotely assigned processing operations, according to some embodiments

Further optimizations to directing remotely assigned query operations may be performed. For example, the data that is read from particular remote objects (including when performing partial aggregations and join operations) may be identified by arguments or input values for executing the remote operations (e.g., aggregate values that match "x"). In order to optimize the performance of what data is read from which remote data object, input values may be dynamically determined and provided for operations performed at remote data objects. FIG. 5 is a logical diagram illustrating input value determinations for remotely assigned processing operations, according to some embodiments.

Local execution plan 510 may be the various locally performed operations, joins, scans, filters, etc., that are executed by local processing 502. Remote processing 504 may execute operations identified by an issue object query 520. Issue object query 520 may contain the operations that are to be performed with respect to remote data objects 550 (e.g., scans, filters, aggregations, joins, etc.) and a determination of which objects to perform operations on, object filtering 540, and what input values (e.g., arguments or parameters) passed as input for the operations, object argument selection 530. For example, object filtering 540 may identify whether or not a data object should be operated on. If, for instance, each data object is partition of table for a time period (e.g., by day) and the query is directed to a specified range of days, then object filtering 540 may exclude any data objects from operations 550 that do not store partitions within the specified range of days.

Object argument selection 530 may determine what arguments (e.g., what data values) are used as conditions, predicates, regular expressions, and so on, for executing operation(s) 550 on the filtered data objects. For example, if a query is directed toward information associated with specific items out of a larger collection of items (e.g., books in a book series by the same author out of a collection of books by different authors), then object argument selection 530 may determine the book identifiers for the books in the book series and pass those identifiers to operations 550 so that aggregation operations, projection operations, filter operations, or any other operations are only performed for records of the books in the book series (as identified by the book identifiers) and the data objects identified by object filtering 540.

Consider the example query given above. If the query is for sales totals of the first week of sales for 3 different books in the series and the remote data objects store sales data for books partitioned according to individual days, then data objects that do not store dates for the first week (7 days) of sales of each of the three books may be pruned out (as discussed above). Object argument selection 530 can then further refines the performance of aggregation performed for each of the remote data objects. Instead of sending a request to summarize sales for the 3 books to each partition, a request may be sent to the data objects that only include the book for which the date of the data object is within the first week of sales. If, for instance, the three books were released years apart (so that there is no overlap in the dates for first week of sales), then instead of sending requests to 21 data objects (3 books*7 days) to aggregate sales for each of the 3 books, 7 requests may be sent to 7 objects with dates in the first week of sales for the first book including only the first book as an aggregation parameter, 7 different requests may be sent to 7 different objects with dates in the first week of sales for the second book including only the second book as an aggregation parameter, and 7 different requests may be sent to 7 different objects with dates in the first week of sales for the third book including only the third book as an aggregation parameter. In this way, the workload for executing the query at the individual data objects is limited to the parameters that ultimately satisfy the query (e.g., within the first week of sales).

Figure 6:
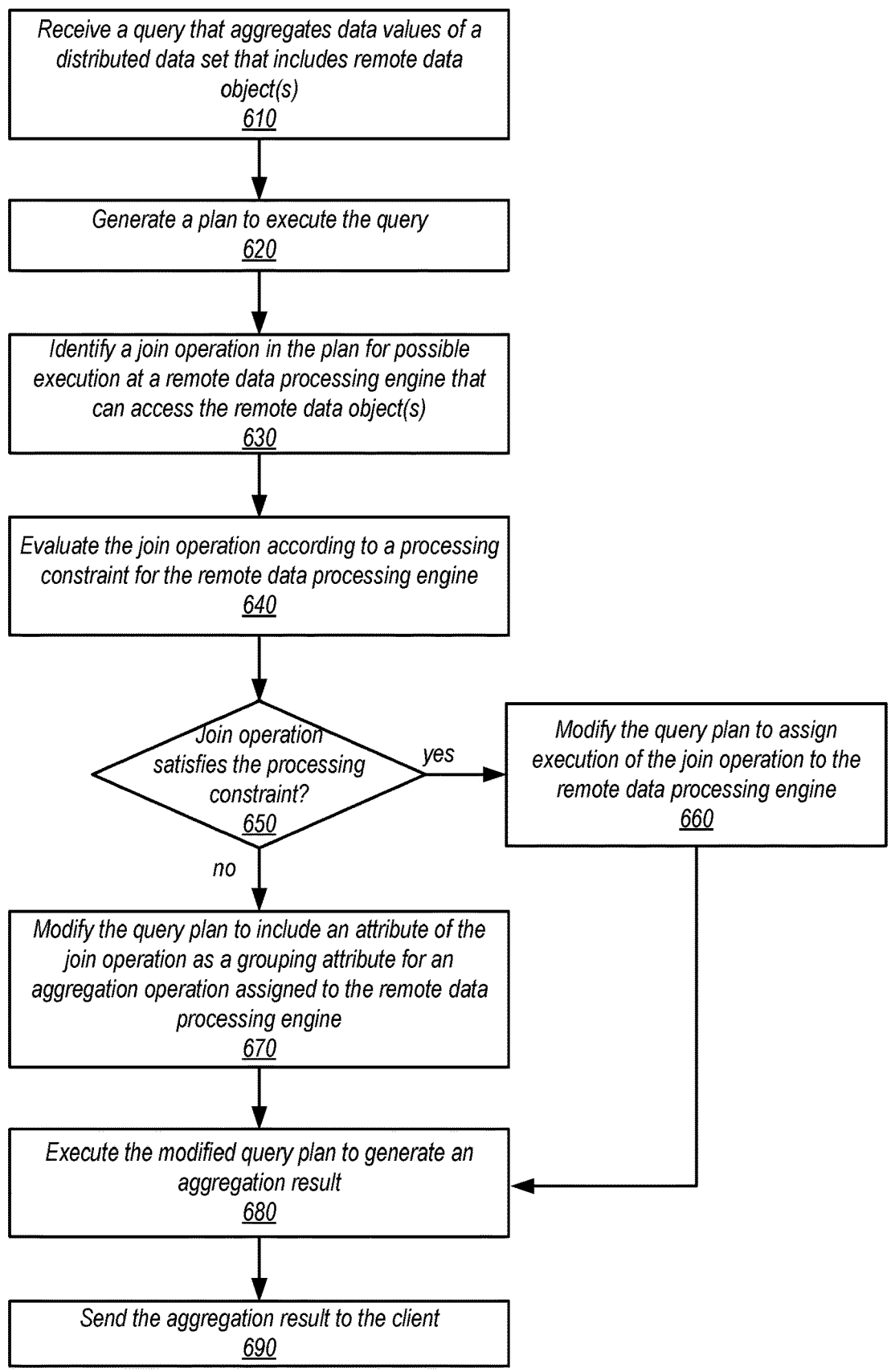
FIG. 6 is a high-level flowchart illustrating methods and techniques to implement selectively assigning join operations for remote data processing, according to some embodiments.

Although FIGS. 2-5 have been described and illustrated in the context of query engines and remote query engines like those described in FIG. 2, the various components illustrated and described in FIGS. 2-5 may be applied to other data processing systems for distributed data processing. As such, FIGS. 2-5 are not intended to be limiting as to other embodiments of query engine, remote query engine, or other component that performs selectively assigning join operations for remote data processing. FIG. 6 is a high-level flowchart illustrating methods and techniques to implement selectively assigning join operations for remote data processing, according to some embodiments. Various different systems and devices may implement the various methods and techniques described below, either singly or working together. For example, an query engine, such as described above with regard to FIGS. 2-5 may be configured to implement the various methods. Alternatively, a combination of different systems and devices. Therefore, the above examples and or any other systems or devices referenced as performing the illustrated method, are not intended to be limiting as to other different components, modules, systems, or configurations of systems and devices.

As indicated at 610, a query that aggregates data values of a distributed data set that includes remote data object(s) may be received, in some embodiments. For example, a SQL statement that includes an aggregation clause like sum, count, average, minimum value, maximum value, or other associative aggregation function may be received that identifies data values in a remote data store (e.g., that is remote from a query engine that received the query) for aggregation. As indicated at 620, a plan to execute the query may be generated. Multiple processing operations, including different types of joins, scans, filters, aggregations, and other operations may be identified and assembled in a plan to execute the query. In at least some embodiments, multiple query plans may be generated an one selected according to cost estimates determined for the different query plans.

As indicated at 630, a join operation the plan may be identified for possible execution at a remote data processing engine (e.g., remote query engine 230 in FIG. 2). that can access the remote data object(s), in some embodiments. For example, a query plan structure (e.g., like the tree structure in FIG. 4A) or a sequence may be compared with patterns including a join operation that can be possible executed at a remote data processing engine (e.g., a join operation that joins a remote scan operation with local processing operations). The identified join operation may be marked or updated within the query plan to signal that the join operation may be remotely executed if the join operation satisfies a processing constraint of the remote query processing engine (e.g., by including an operator, flag, or other marker in the query plan to signal the conditional nature of the join operation). As noted above with regard to FIG. 1, different types of join operations may be identified for remote processing, including full join operations or semi-join operations.

As indicated at 640, the join operation may be evaluated according to a processing constraint for the remote data processing engine. For example, results to be joined according to the join operation may be dynamically determined as other portions of the query plan (e.g., a right-hand sub-plan of a tree-based query plan) are executed. If the results (e.g., data values) are within a size, number, or other limit (e.g., that corresponds to a processor utilization limit, memory utilization limit, or other limit for processing operations at the remote data processing engine, the join operation may satisfy the processing constraint. As indicated at 660, for those join operations that satisfy the constraint, the query plan may be modified to assign execution of the join operation to the remote data processing engine. For example, execution instructions for the query plan that describe remote processing operations may be altered to include the join operation. Other modifications including adding or eliminating join operations may also be performed (e.g., as discussed above with regard to FIGS. 4B and 4C). Then, as indicated at 680, the modified query plan may be executed to generate an aggregation result. For example, partial aggregation operations (as discussed above with regard to FIGS. 4B and 4C) may be remotely performed and the partial aggregation results of those operations and the remotely assigned join operation may be completed locally to generate an aggregation result. As indicated at 690, the aggregation result may then be sent back to the client.

Consider an example, where the remote data store stores a table, orders with columns (product_id, quantity) that describe how many units of products were sold in orders, and a local table products with columns (product_id, price, category) with the prices and categories of the products. An aggregation query may be received that states:

```
SELECT SUM(o.quantity * p.price)
FROM remote.orders AS o, local.products AS p
WHERE o.product_id = o.product_id AND p.category =
    'snacks'
```

The join operation between the orders and the snack products could be remotely executed if the snack products and prices fit within the processing constraint for the remote data processing engine. The final result is total snack sales, which may be generated from multiple partial summation values for snack sales data performed at remote data processing engine that are sent back to a local data processing engine and combined before being sent back to the client.

In some embodiments, aggregation operations may still be performed even if a join operation is not pushed down. For example, as indicated by the negative exit from 650, if the join operation does not satisfy the processing constraint, the query plan may still be modified to include an attribute of the join operation as a grouping attribute for the aggregation operation assigned to the remote data processing engine, as indicated at 670. Consider the above example, if the number of identified snack products was greater than a processing constraint size for the remote data processing engine, then the sum operation may be still be remotely executed by grouping the quantity summaries by product_id. In this way, some aggregation can still be performed remotely (aggregating the number of each product sold) rather than scanning and sending every product sold back to a local data processing engine.

The methods described herein may in various embodiments be implemented by any combination of hardware and software. For example, in one embodiment, the methods may be implemented by a computer system (e.g., a computer system as in FIG. 7) that includes one or more processors executing program instructions stored on a computer-readable storage medium coupled to the processors. The program instructions may be configured to implement the functionality described herein. The various methods as illustrated in the figures and described herein represent example embodiments of methods. The order of any method may be changed, and various elements may be added, reordered, combined, omitted, modified, etc.

Embodiments of selectively assigning join operations for remote data processing as described herein may be executed on one or more computer systems, which may interact with various other devices. One such computer system is illustrated by FIG. 7. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of compute node, computing device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 7:
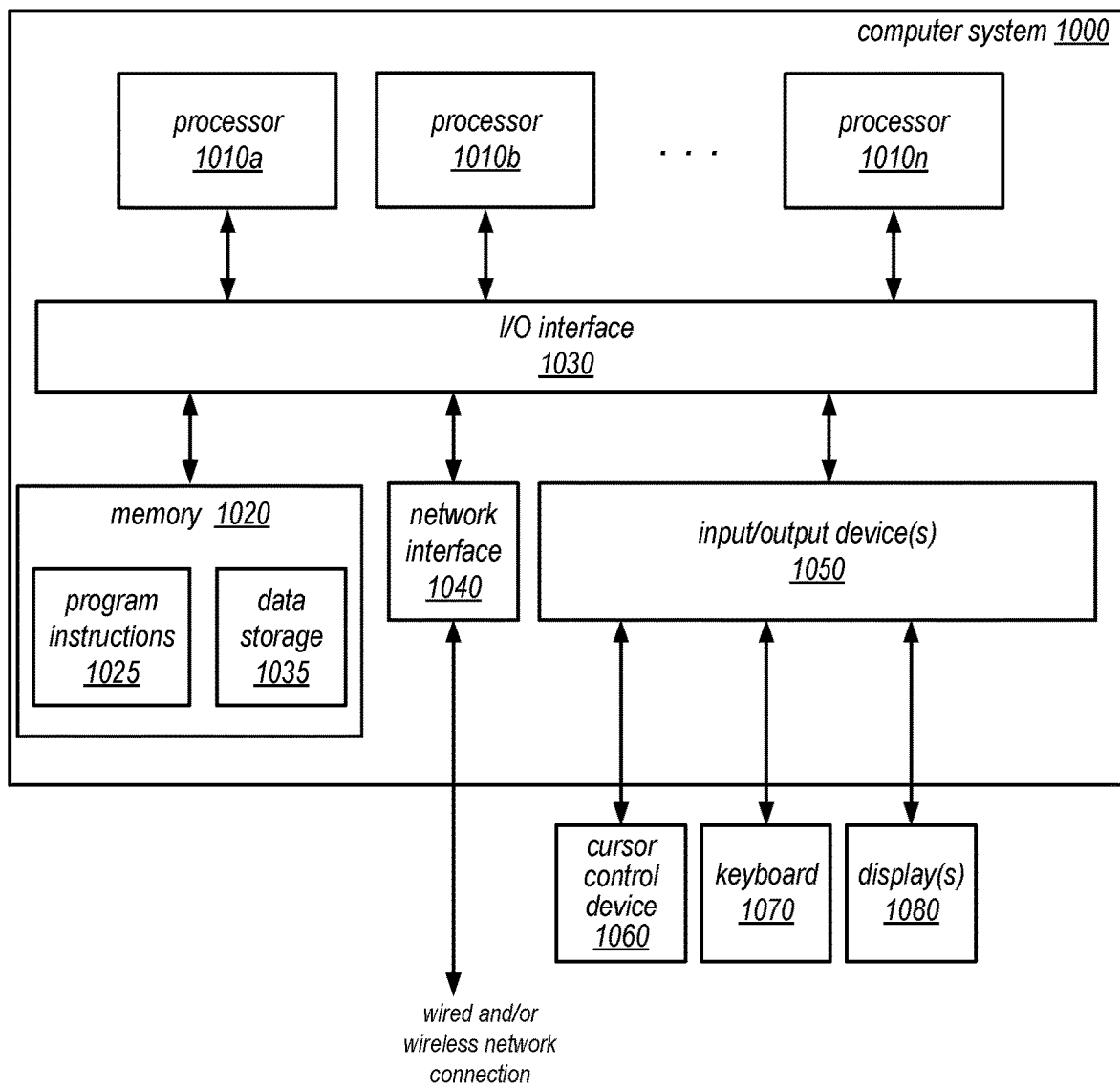
FIG. 7 illustrates an example system configured to implement the various methods, techniques, and systems described herein, according to some embodiments.

As shown in FIG. 7, memory 1020 may include program instructions 1025, configured to implement the various methods and techniques as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
a local data store, configured to store one or more data objects;
one or more compute nodes, respectively comprising at least one processor and a memory, that implement a data processing engine;
the data processing engine, configured to:
receive a query from a client that aggregates data values in a distributed data set comprising a plurality of data objects including the one or more data objects, wherein at least one of the data objects is stored in a data store that is remote to the data processing engine;

generate a plan to execute the query that comprises a plurality of different operations;

evaluate the plan to identify a join operation of the plan for possible execution at a remote data processing engine that can access the at least one data object in the remote data store;

compare a size of results to be joined for the join operation with a result store limitation at the remote data processing engine to determine whether a utilization of a resource at the remote data processing engine to perform the join operation is within a processing constraint of the resource that limits a capability of the remote data processing engine to store partial results generated at the remote data processing engine as part of executing the join operation;

in response to the determination that the utilization of the resource to perform the join operation at the remote data processing engine is within the processing constraint;

modify the plan to assign execution of the join operation to the remote data processing engine;

send, to the remote data processing engine, a request to execute the join operation as part of executing the modified plan at the data processing engine; and receive, from the remote data processing engine, an operation result of the join operation;

in response to the determination that the utilization of the resource to perform the join operation at the remote data processing engine is not within the processing constraint:

modify the plan to assign a portion of the join operation comprising an aggregation operation, to the remote data processing engine;

send to the remote data processing engine a request to execute the aggregation operation as part of executing the modified plan at the data processing engine; and receive, from the remote data processing engine, an operation result of the aggregation operation; and after execution of the modified plan, send a result for the query to the client, wherein the result for the query is based at least in part on the operation result received from the remote data processing engine.

2. The system of claim 1, wherein to modify the plan, the data processing engine is configured to eliminate another join operation in the plan that is assigned to the data processing engine.

3. The system of claim 1, wherein the join operation is a semi-join operation.

4. A method, comprising:
performing, by one or more computing devices:
receiving a query from a client that aggregates data values in a distributed data set comprising a plurality of data objects, wherein at least one of the data objects is stored in a remote data store;

generating a plan to execute the query that comprises a plurality of different operations;

identifying a join operation of the plan for possible execution at a remote data processing engine that can access the at least one data object in the remote data store;

comparing a size of results to be joined for the join operation with a result store limitation at the remote data processing engine to determine whether a utilization of a resource at the remote data processing engine to perform the join operation is within a processing constraint of the resource that limits a capability of the remote data processing engine to store partial results generated at the remote data processing engine as part of executing the join operation;

in response to determining that the utilization of the resource at the remote data processing engine to perform the join operation is within the processing constraint of the resource:

modifying the plan to assign execution of the join operation to the remote data processing engine;

sending, to the remote data processing engine, a request to execute the join operation as part of executing the modified plan at the data processing engine; and receiving, from the remote data processing engine, an operation result of the join operation;

in response to determining that the utilization of the resource to perform the join operation at the remote data processing engine is not within the processing constraint:

modifying the plan to assign only a portion comprising an aggregation operation that is less than an entirety of the join operation, to the remote data processing engine;

sending to the remote data processing engine a request to execute the aggregation operation as part of executing the modified plan at the data processing engine; and receiving, from the remote data processing engine, an operation result of the aggregation operation; and after executing the modified plan, sending a result for the query to the client, wherein the result for the query is based at least in part on the operation result received from the remote data processing engine.

5. The method of claim 4, wherein identifying the join operation of the plan for possible execution at the remote data processing engine comprises evaluating a tree structure of the plan to determine that the join operation joins a scan operation with another operation in a left corner of the tree structure.

6. The method of claim 4, wherein the join operation is a semi-join operation.

7. The method of claim 4, further comprising:
wherein the method further comprises modifying the plan to assign execution of a partial aggregation operation to the remote data processing engine; and wherein the aggregation result is generated based, at least in part, on one or more partial aggregation results of the partial aggregation operation at the remote data processing engine.

8. The method of claim 4, wherein modifying the plan to assign execution of the join operation at the remote data processing engine comprises eliminating another join operation that is locally performed.

9. The method of claim 4, wherein modifying the plan to assign execution of the join operation at the remote data processing engine comprises adding another join operation that is locally performed to the plan.

10. The method of claim 4, further comprising:
- receiving another query from the client or a different client that aggregates data values in the distributed data set;
- generating another plan to execute the other query that comprises a plurality of different operations;
- identifying a join operation of the other plan for possible execution at the remote data processing engine or another remote data processing engine that can access the at least one data object in the remote data store;
- evaluating the join operation of the other plan according to the processing constraint for the remote data processing engine or a processing constraint for the other remote data processing engine to determine that execution of the join operation at the remote data processing engine or the other remote data processing engine does not satisfy the processing constraint;
- modifying the other plan to include an attribute of the join operation of the other plan as a grouping attribute for an aggregation operation of the other plan assigned to the remote data processing engine or the other remote data processing engine;
- executing the modified other plan to generate an aggregation result for the other query; and
- sending the aggregation result for the other query to the client or the different client.

11. The method of claim 4, further comprising:
- receiving another query from the client or a different client directed to the distributed data set;
- generating another plan to execute the other query that comprises a plurality of different operations, wherein one or more of the operations are assigned to remote processing with respect to one or more of the data objects;
- evaluating the other plan to determine a respective one or more input parameters for the one or more operations assigned to remote processing, wherein the respective one or more input parameters for one of the operations assigned to remote data processing is different than the respective one or more input parameters for another one of the operations assigned to remote data processing;
- executing the operations assigned to remote processing according to the respective input parameters as part of executing the other query plan; and
- sending a result determined from the execution of the other query plan for the other query to the client or the different client.

12. A non-transitory, computer-readable storage medium, storing program instructions that when executed by one or more computing devices cause the one or more computing devices to implement:
- receiving a query from a client that aggregates data values in a distributed data set comprising a plurality of data objects, wherein at least one of the data objects is stored in a remote data store;
- generating a plan to execute the query that comprises a plurality of different operations;
- identifying a join operation of the plan for possible execution at a remote data processing engine that can access the at least one data object in the remote data store;
- comparing a size of results to be joined for the join operation with a result store limitation at the remote data processing engine to determine whether a utilization of a resource at the remote data processing engine to perform the join operation is within a processing constraint of the resource that limits a capability of the remote data processing engine to store partial results generated at the remote data processing engine as part of executing the join operation;
- in response to determining that the utilization of the resource at the remote data processing engine to perform the join operation is within the processing constraint of the resource:
  - modifying the plan to assign execution of the join operation to the remote data processing engine;
  - sending, to the remote data processing engine, a request to execute the join operation as part of executing the modified plan at the data processing engine; and
  - receiving, from the remote data processing engine, an operation result of the join operation;
- in response to determining that the utilization of the resource to perform the join operation at the remote data processing engine is not within the processing constraint:
  - modifying the plan to assign only a portion comprising an aggregation operation that is less than an entirety of the join operation, to the remote data processing engine;
  - sending to the remote data processing engine a request to execute the aggregation operation as part of executing the modified plan at the data processing engine; and
  - receiving, from the remote data processing engine, an operation result of the aggregation operation; and
- after executing the modified plan, sending a result for the query to the client, wherein the result for the query is based at least in part on the operation result received from the remote data processing engine.

13. The non-transitory, computer-readable storage medium of claim 12, wherein, in identifying the join operation of the plan for possible execution at the remote data processing engine, the program instructions cause the one or more computing devices to implement evaluating a tree structure of the plan to determine that the join operation joins a scan operation with another operation in a left corner of the tree structure.

14. The non-transitory, computer-readable storage medium of claim 12, wherein the join operation is a semi-join operation.

15. The non-transitory, computer-readable storage medium of claim 12, wherein the program instructions further cause the one or more computing devices to implement:
- wherein the method further comprises modifying the plan to assign execution of a partial aggregation operation to the remote data processing engine; and
- wherein the aggregation result is generated based, at least in part, on one or more partial aggregation results of the partial aggregation operation at the remote data processing engine.

16. The non-transitory, computer-readable storage medium of claim 12, wherein, in modifying the plan to assign execution of the join operation at the remote data processing engine, the program instructions cause the one or more computing devices to implement eliminating another join operation that is locally performed.

17. The non-transitory, computer-readable storage medium of claim 12, wherein, in modifying the plan to assign execution of the join operation to the remote data processing engine, the program instructions cause the one or more computing devices to implement adding another join operation that is locally performed to the plan.

* * * * *